US007686462B2

(12) United States Patent
Jones

(10) Patent No.: US 7,686,462 B2

(45) Date of Patent: Mar. 30, 2010

(54) METHODS FOR REFLECTION REDUCTIONS

(75) Inventor: Peter W. J. Jones, Belmont, MA (US)

(73) Assignee: Tenebraex Corporation, Boston, MA (US)

( * ) Notice: Subject to any disclaimer, the term of this patent is extended or adjusted under 35 U.S.C. 154(b) by 1366 days.

(21) Appl. No.: 09/094,052

(22) Filed: Jun. 9, 1998

(65) Prior Publication Data

US 2002/0039236 A1 Apr. 4, 2002

Related U.S. Application Data

(60) Provisional application No. 60/048,998, filed on Jun. 9, 1997.

(51) Int. Cl.
*G02B 27/00* (2006.01)

(52) U.S. Cl. ........................................ 359/601; 359/613

(58) Field of Classification Search ......... 359/601–614, 359/726
See application file for complete search history.

(56) References Cited

U.S. PATENT DOCUMENTS 693,088 A * 2/1902 Wadsworth ................. 359/613
4,323,298 A * 4/1982 Brennan ..................... 359/411
4,365,866 A * 12/1982 Softly ........................ 359/613
4,929,055 A * 5/1990 Jones ......................... 359/601
5,210,645 A * 5/1993 Orino et al. ................. 359/601

FOREIGN PATENT DOCUMENTS

DE 2 317 642 * 10/1974 ................. 359/601
GB 414220 * 8/1934 ................. 359/601
WO WO 95/33220 * 12/1995 ................. 359/726

* cited by examiner

*Primary Examiner*—Thong Nguyen
(74) *Attorney, Agent, or Firm*—Edwards Angell Palmer & Dodge LLP; Peter F. Corless; William J. Daley, Jr.

(57) ABSTRACT

System and method for limiting reflections off of surfaces, such as optical lens and field goggles. A set of vanes are mounted next to the surface, with one end near the surface and the other end away from the surface. The vanes are mounted closer together at their end near the surface. This permits a wide field of view (FOV) for surfaces such as optical lenses. The vanes can be arranged in various forms, including concentric rings.

8 Claims, 8 Drawing Sheets

METHODS FOR REFLECTION REDUCTIONS

RELATED APPLICATION

The present application claims the benefit of U.S. Provisional Application No. 60/048,998 filed Jun. 9, 1997, which is fully incorporated herein by reference.

FIELD OF THE INVENTION

This invention relates generally to minimization of reflections from surfaces, and more specifically reflections from objective lenses or other reflective surfaces of wide-angle field of view optical devices.

BACKGROUND OF THE INVENTION

Reflections from the objective lens or other reflective surfaces of an optical system (glint) have long been a problem, especially in a battlefield environment. These reflections turn out to also be a problem with wide-angle field-of-view (FOV) optics such as night vision goggles. This is especially so when operating in an environment where relatively bright ambient sources such as street lights are present, or in situations where the enemy also has night vision equipment and thus can see reflections of moon or starlight from an objective lens or reflective filter.

An existing method of reducing or eliminating such reflections is to put a honeycomb grid of tubes in front of the objective lens (as is described in U.S. Pat. No. 4,929,055, which is fully incorporated herein by reference). The tubes in these devices have walls that are parallel to the optical axis of the device to which it is fitted.

This technique, however, is not an effective solution with wide angle FOV devices, since if the length-to-width ratio of the tubes which make up the honeycomb of parallel-walled tubes is shallow enough not to vignette the view through the optic, then the tubes are not deep enough to give affective glint protection. This means that in a battlefield situation, wide-angle FOV optical devices are vulnerable to being detected by an envoy, and thus dangerous to use.

Accordingly, it is highly desirable, if not necessary, to devise other techniques for substantially preventing reflections from the reflecting surfaces of wide-angle FOV optical devices.

As can be seen in FIG. 1, a reflective element 1 of an optical device 2 can reflect light rays 5 from a light source 3 to an observer 4. The Observer 4 includes sophisticated light detection systems possibly operating in the infrared and ultraviolet spectrums as well as human or animal observers.

An existing method of hiding such reflections is shown in FIG. 2. where a honeycomb of parallel-walled tubes 6 is placed in front of the optical device 2. The walls of the tubes are parallel to the optical axis of the device to which it is fitted. This collection of tubes 6 prevents light from a source 3 from reflecting to an observer 4.

As shown in FIG. 3, the length-to-width ratio of the tubes 6 that make up the honeycomb cannot exceed the length-to-width ratio of the FOV 13 of the optical device to which it is fitted. In this way, the anti-reflection shield does not restrict field of view seen through the optical device.

As shown in FIG. 4, an example of this would be the U.S. Army's PVS-7 night vision goggles, which have a FOV 13 of 40°. If one were to use the existing method of reflection protection, the length-to-width ratio of the deepest (longest) tubes 6 that could be used in a conventional anti-reflection shield are 1:1.38. This is not deep enough to give good glint protection. If deeper tubes are used, they would intrude on the FOV and vignette the image seen through the device, as illustrated in FIG. 5.

The problem has been how to get tubes long enough to provide effective glint protection without vignetting the view through the optic.

SUMMARY

It is an objective of the present invention to provide reflection and glint protection while allowing a wide field of view (FOV) for surfaces including optical lenses.

The present invention includes an apparatus for reducing reflection on a surface including a plurality of concentric circular vanes, each of the vanes including a first end proximate the surface. The second end of the plurality of vanes is away from the surface. The first ends of the plurality of vanes are positioned closer together to each other than said second ends of said plurality of vanes.

This surface includes optical lenses, wide FOV lenses, binoculars, telescopes, gun sights and night vision goggles.

In another embodiment, the first ends of the plurality of vanes are positioned further apart from each other than the second ends of the plurality of vanes.

In another embodiment, a plurality of radial vanes are interconnected with the plurality of concentric circular vanes.

The present invention includes a system and method for reducing reflection from a surface of an optical lens comprising vane means for limiting reflections from said surface while maintaining a substantially wide Field of View (FOV) for said optical lens. The vane means is for mounting proximate a surface of the optical lens.

DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

Figure 1:
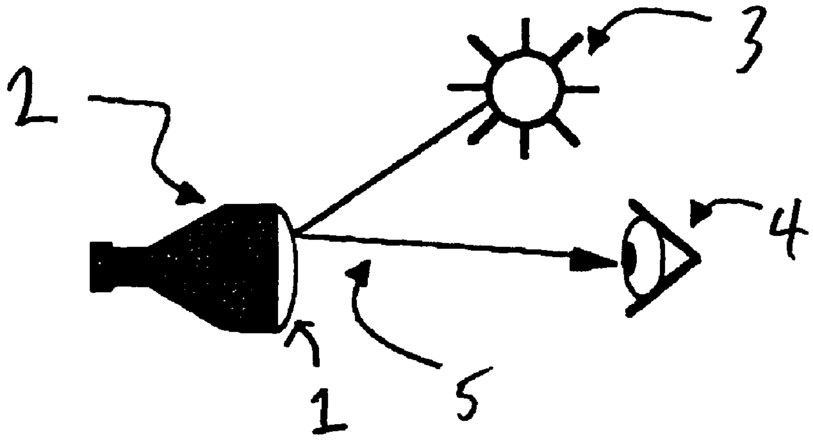
FIG. 1 is an overview of a reflection problem.
Figure 2:
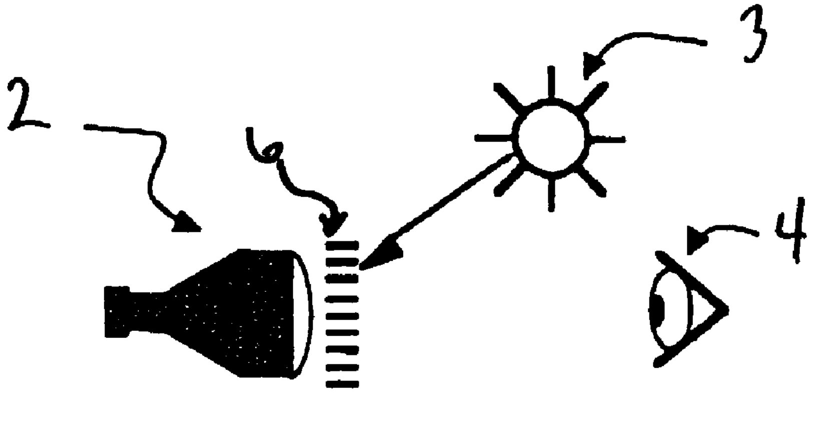
FIG. 2 is an overview of prior attempt to correct a reflection problem.
Figure 3:
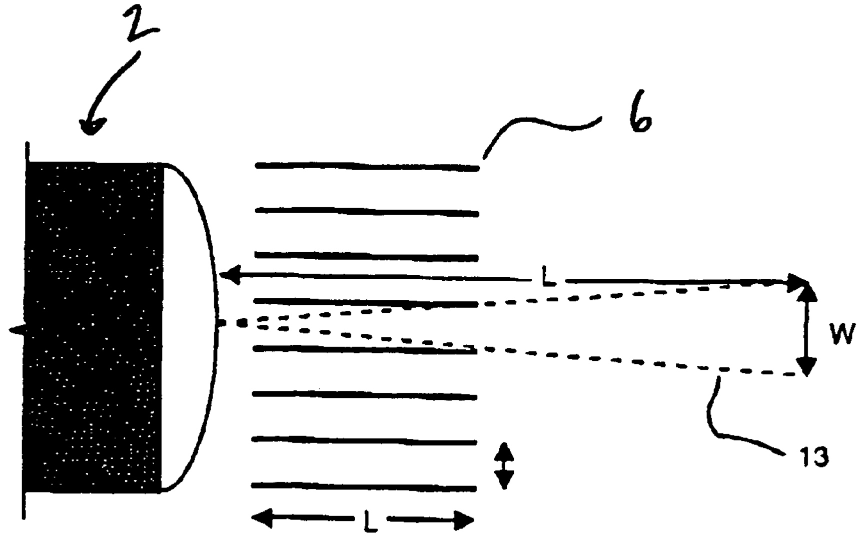
FIG. 3 provides details of the Field of View (FOV) of FIG. 2.
Figure 4:
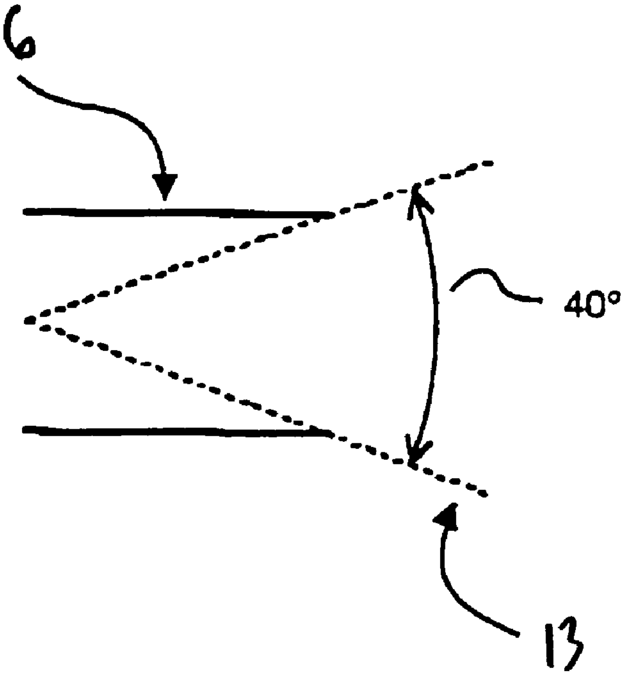
FIG. 4 provides details of FOV angles.
Figure 5:
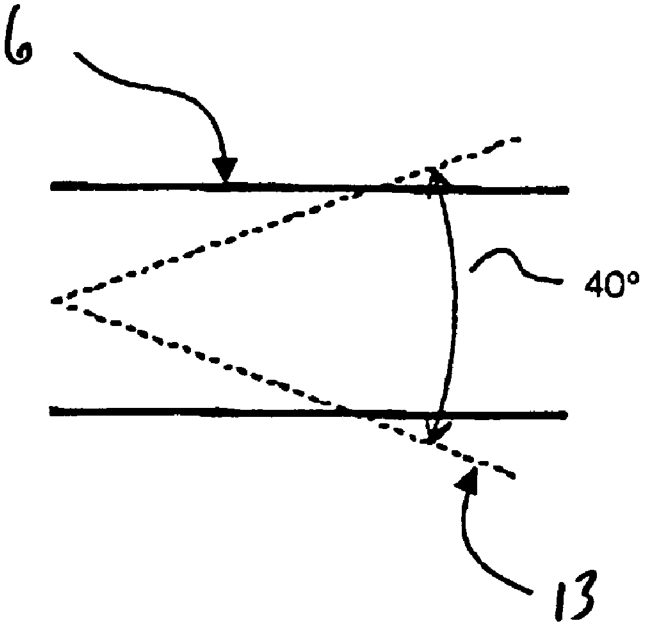
FIG. 5 provides details of FOV angles.
Figure 6:
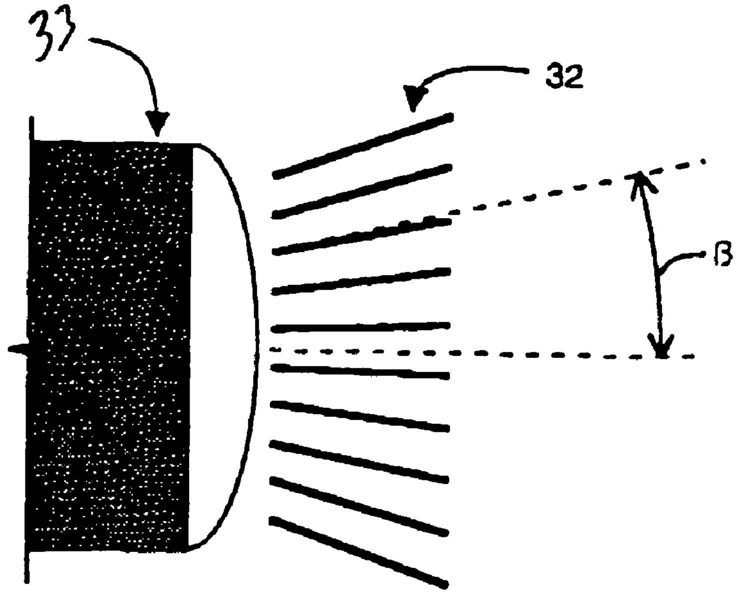
FIG. 6 illustrates an embodiment of the present invention.

In the novel technique, shown in one embodiment in FIG. 6, we describe a shield made up of deep tubes 32, the walls of which are not parallel, which is placed in front of a wide-angle FOV optic 33.

Figure 7:
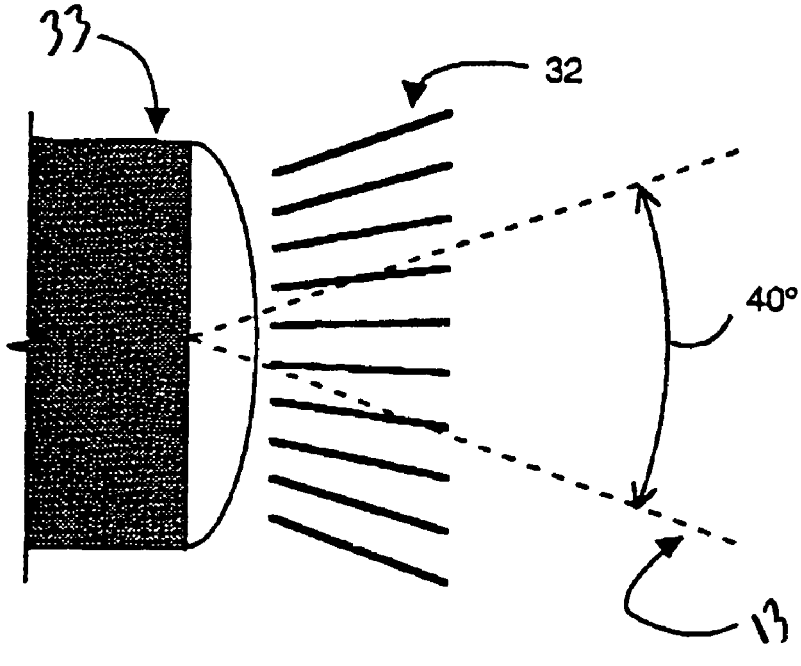
FIG. 7 details FOV angles for the embodiment illustrated in FIG. 6.

As shown in FIG. 7, this would seem to give a structure 32 that would vignette the FOV 13 seen through a wide-angle FOV optic 33; this actually is not the case.

Figure 8:
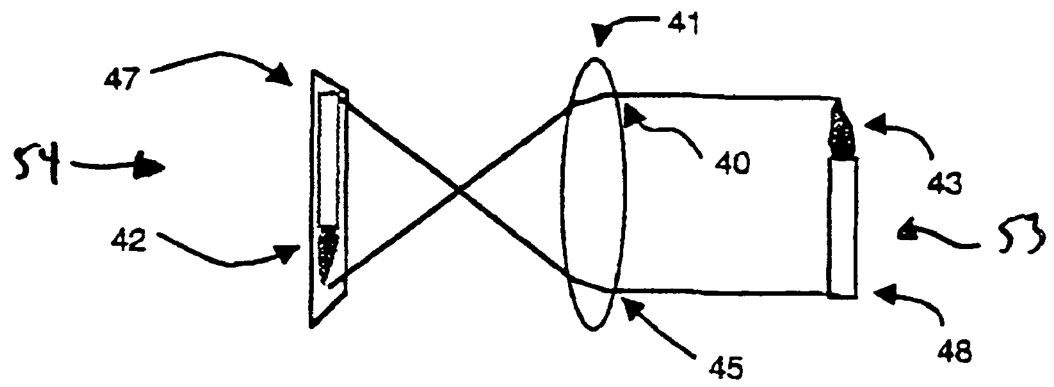
FIGS. 8 and 9 illustrate details of optical image forming by convex lenses.
Figure 9:
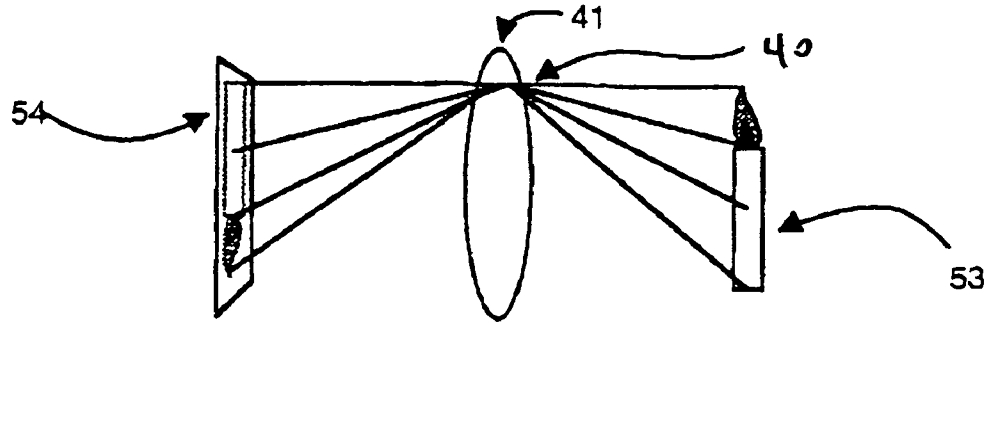

As shown in FIG. 8, unlike the common explanation found in physics text books of how a lens forms an image, where this is shown by a drawing where a point 40 on the top of a lens 41 forms the image 42 of the top of the subject 43, such as a candle, and the point 45 at the bottom of the lens forms the image 47 of the bottom of the subject 48, what actually happens is shown in FIG. 9, where each point on the lens, as shown with point 51, forms the image 54 of the entire subject 53.

Figure 10:
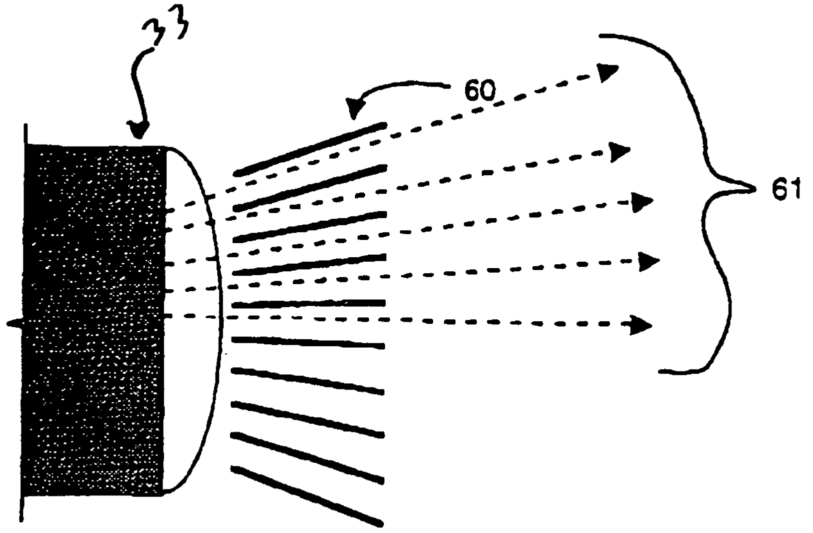
FIG. 10 illustrates a further embodiment of the present invention.

With this in mind, we describe a technique for protecting wide angle FOV optics from glint as shown in FIG. 10, wherein we arrange the cell walls 60 that make up the tubes of the antireflection shield such that the walls are parallel to the varying view angles 61 contained within the optic's FOV.

Figure 11:
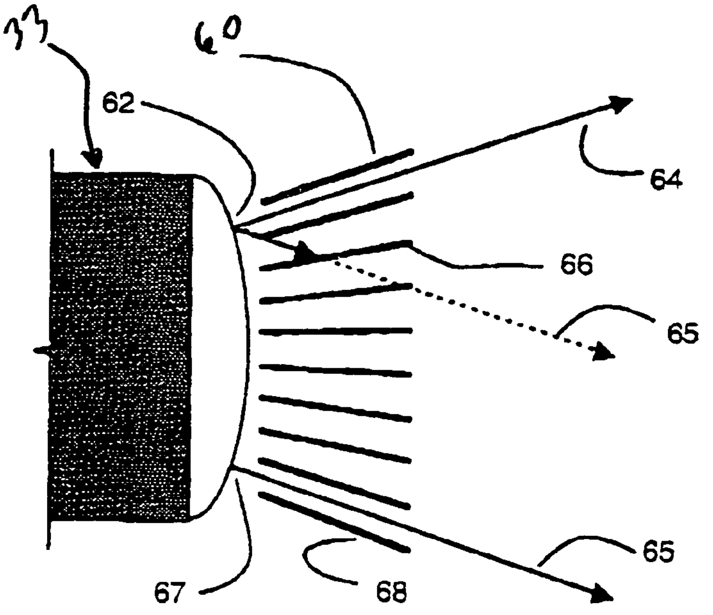
FIG. 11 details FOV angles for the embodiment illustrated in FIG. 10.

As shown in FIG. 11, while in such an arrangement a tube wall 66 would block a point 62 at the top of the lens from seeing on a viewing angle 65 downwards to the bottom part of its normal FOV, there is a point 67 at the bottom of the lens that would have an unobstructed view on the view angle 65 through the tube formed by wall 68. Thus with this new arrangement of tubes, the optical system will, in total, be able to maintain its full FOV in order to form a complete image, and the tubes in the shield can be made long enough to give effective glint protection.

Figure 12:
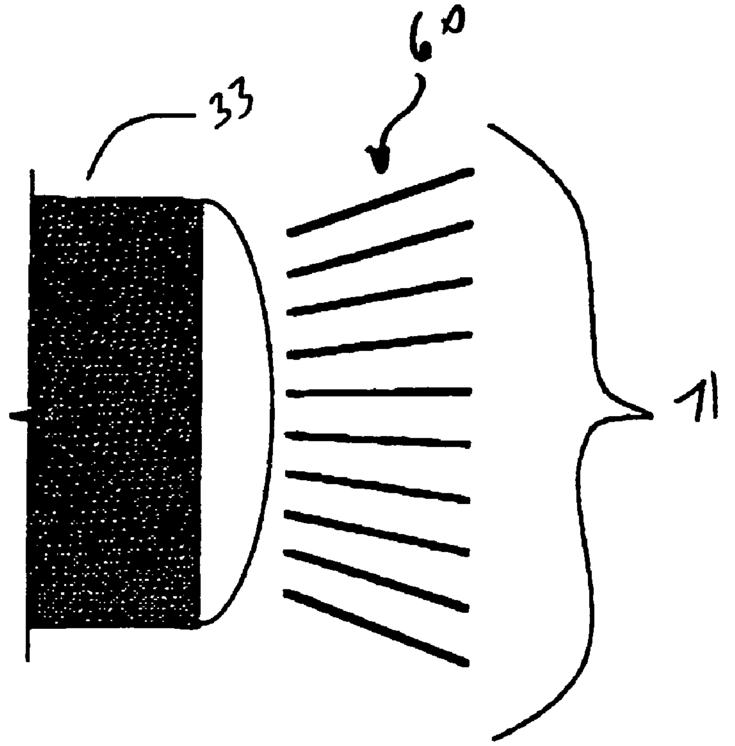
FIG. 12 illustrates a further embodiment of the present invention.

These tubes can be arranged in various manners. For example, in a section through one embodiment of such a shield as shown in FIG. 12, the walls 60 could be arranged to form concentric tubes that have a conical section. These conical sections would be arranged so that their wall angles gradually splayed to accommodate the range of viewing angles contained or thin the wide-angle FOV 71 of the optical device to be protected 33.

Figure 13:
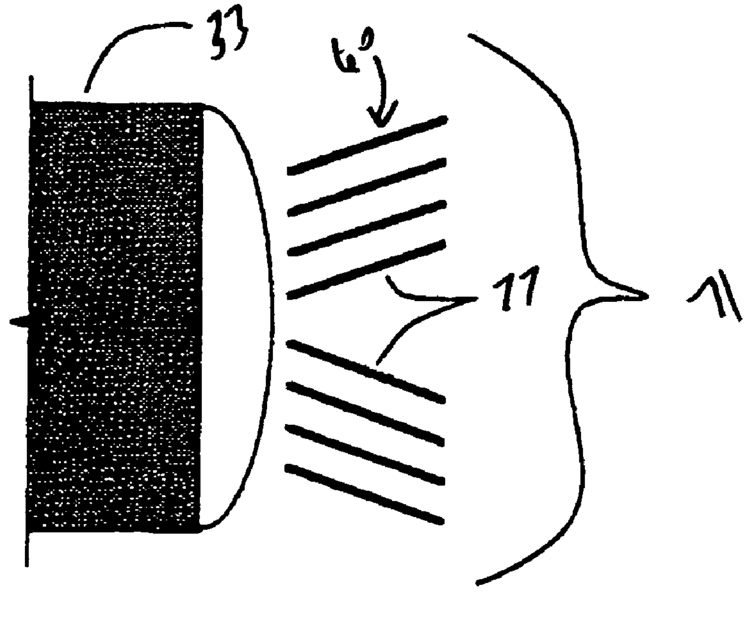
FIG. 13 illustrates a further embodiment of the present invention.

Alternatively, as shown in a section through another embodiment of such a shield in FIG. 13, the tube walls 60 could simply have one fixed angle and then be nested concentrically. The wall angles would be selected be related relation to the angle of the FOV of the optic that is to be protected 33. The center conical tube 77 would provide the clear sight lines to the center of the optic's FOV.

Figure 14:
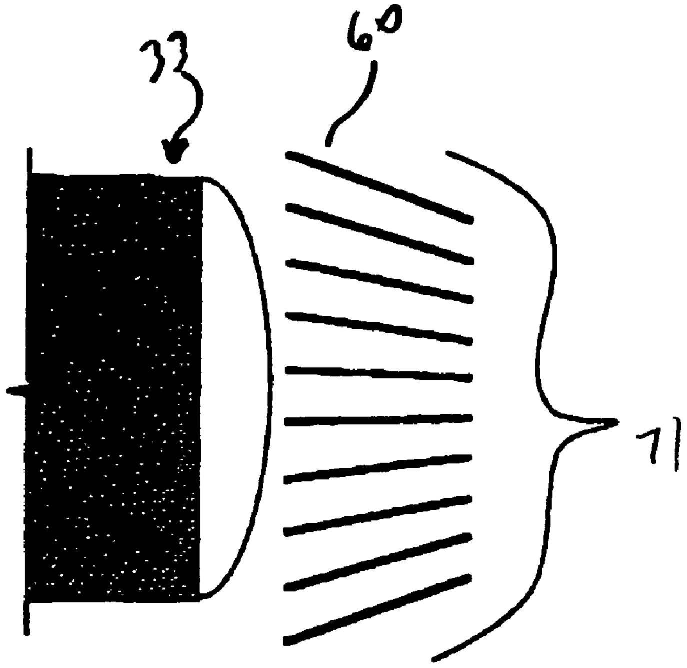
FIG. 14 illustrates yet another embodiment of the present invention.

As shown in FIG. 14 in a section through yet another embodiment of such a shield, the walls that form the tubes 60 could splay inwards, rather than outwards.

Figure 15:
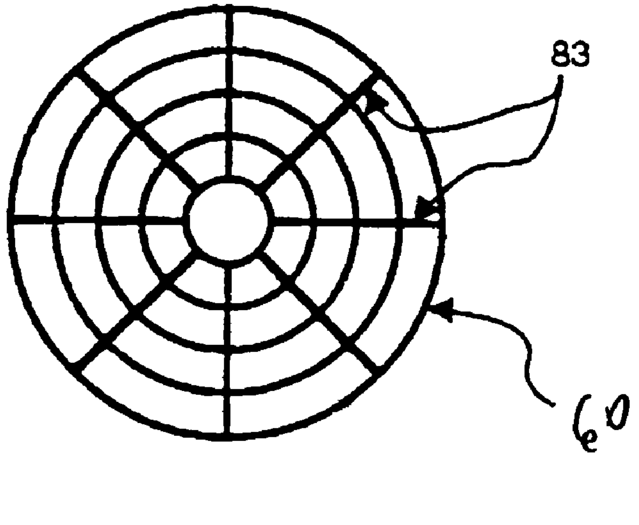
FIG. 15 illustrates yet another embodiment of the present invention.

As shown in a front view in FIG. 15, to increase the glint masking ability of this new configuration of an anti-reflection shield, radial vanes 83 can be inserted between the concentric tubes 60 in a manner.

This new technique of using non-parallel tube walls will give critical protection to wide-angle FOV optics on the battlefield.

Note that with this configuration, most points on the surface of the objective lens will have some of their lines of view blocked. This may cause a greater light loss than with the light loss from the earlier method of using a honeycomb of parallel-walled tubes. However, the increased light loss would be acceptable in many battlefield situations if this improved shield keeps the user of the optical device from being detected by the enemy because of reflections.

Further, with respect to the inwardly converging tubular elements as exemplified in FIG. 14, that tubular element configuration can provide the significant advantage of reducing reflections from a lens substrate that is significantly curved. That is, the inwardly converging tubular elements can effectively capture reflections from such a curved lens surface.

Suitable tubular elements for use in accordance with the present invention are disclosed in U.S. Pat. No. 4,929,055 and PCT/US93/11459, which are both fully incorporated herein by reference.

As various changes could be made in the above constructions without departing from the scope of the invention, it should be understood that all matter contained in the above description or shown in the accompanying drawings shall be interpreted as illustrative and not in a limiting sense.

What is claimed is:

1. An apparatus for reducing reflection on a surface of an optical lens assembly that is configured so as to have a wide field of view (FOV), said surface corresponding to an input end of the lens assembly in which is inputted light of images being viewed, said apparatus comprising:

a plurality of concentric circular vanes, mounted in front of said reflective surface, each of said vanes including a first end proximate said surface, and a second end distal from said lens surface, wherein said first ends of said plurality of vanes are spaced apart from each other at a different distance than said second ends of said plurality of vanes are spaced apart from each other, and wherein said first ends of said plurality of vanes are spaced further apart from each other than said second ends of said plurality of vanes where light from an image to be viewed enters said second ends and exits said first ends and passes to said lens assembly input end; and wherein said plurality of concentric circular vanes are arranged such that light reflecting from said lens surface is essentially not viewable by an observer located distal from said second ends and so that a user viewing through the lens assembly can observe the image corresponding to the wide field of view of the lens assembly.

2. The apparatus of claim 1 wherein said lens assembly is contained within field goggles and wherein said apparatus is configured to be mounted on field goggles.

3. The apparatus of claim 2 wherein said field goggles include night-vision goggles.

4. The apparatus of claim 1 further including:

a plurality of radial vanes interconnected with said plurality of concentric circular vanes.

5. The apparatus of claim 1, wherein said first ends of said plurality of vanes are spaced apart from each other at a fixed distance and said second ends of said plurality of vanes are spaced apart from each other at a fixed distance.

6. The system of claim 1, wherein the wide angle Field of View (FOV) of an optical lens of said lens assembly is at least 40°.

7. The system of claim 1, wherein the plurality of concentric circular vanes are arranged so as to produce tubes with a length-to width ratio greater than the length to width ratio of the FOV.

8. An apparatus for reducing reflection from a surface of a wide angle Field of View (FOV) optical lens assembly, said apparatus comprising:

a plurality of concentric circular vanes, mounted in front of said reflective surface, each of said vanes including a first end proximate said surface, and a second end away from said surface, wherein said first ends of said plurality of vanes are spaced apart from each other at a different distance than said second ends of said plurality of vanes are spaced apart from each other, wherein said plurality of concentric circular vanes are arranged such that light reflecting from said lens surface is essentially not viewable by an observer located distal from said second ends and so that a user viewing through the wide FOV lens assembly can view an image corresponding to the wide field of view of the lens assembly, whereby a wide field of view through the reflective surface is maintained.

* * * * *